United States Patent
Hashimoto et al.

(10) Patent No.: US 6,374,196 B1
(45) Date of Patent: Apr. 16, 2002

(54) METHOD OF FAULT DIAGNOSIS BASED ON PROPAGATION MODEL

(75) Inventors: Kazuo Hashimoto, Fujimi; Kazunori Matsumoto, Ohmiya, both of (JP)

(73) Assignee: KDD Corporation, Tokyo (JP)

( * ) Notice: Subject to any disclaimer, the term of this patent is extended or adjusted under 35 U.S.C. 154(b) by 0 days.

(21) Appl. No.: 09/270,664

(22) Filed: Mar. 16, 1999

(30) Foreign Application Priority Data

| Mar. 16, 1998 | (JP) | 10-065501 |
| May 27, 1998 | (JP) | 10-145945 |
| Sep. 22, 1998 | (JP) | 10-268030 |

(51) Int. Cl.$^7$ .............................................. G06F 11/30
(52) U.S. Cl. ..................... 702/183; 702/181; 702/183; 702/184; 702/185; 702/116; 700/79; 455/446
(58) Field of Search .................................. 702/181, 183, 702/184, 185, 79, 116; 714/25, 26; 455/661; 700/79

(56) References Cited

U.S. PATENT DOCUMENTS

| 5,214,577 A | * | 5/1993 | Sztipanovits et al. | 700/79 |
| 5,465,321 A | * | 11/1995 | Smyth | 706/20 |
| 5,629,872 A | * | 5/1997 | Gross et al. | 702/116 |
| 6,147,974 A | * | 11/2000 | Matsumoto et al. | 370/252 |

* cited by examiner

Primary Examiner—Arthur T. Grimloy
Assistant Examiner—Mohamed Charioui (57) ABSTRACT

An alarm propagation model of a transmission line is expressed by an equation. A fault portion on the transmission line is estimated by using the alarm propagation model. As a result, it is possible to estimate the fault portion by minimum observation time without lack of precision.

4 Claims, 8 Drawing Sheets

METHOD OF FAULT DIAGNOSIS BASED ON PROPAGATION MODEL

FIELD OF THE INVENTION

This invention relates to a method of fault diagnosis based on a propagation model, specifically, it relates to a method for diagnosing a fault by using, as observed information, a time-series of alarms.

BACKGROUND

Regarding a fault diagnosis of a transmission line, prior art will be described.

The transmission line is composed of tandem connected multiplexer and/or terminating sets etc. For monitoring the transmission line system. ITU-T series G recommendations prescribe how to generate an alarm in each device which composes the system.

According to the alarm generation method prescribed by the ITU-T series G recommendations, when a communication is stopped by a fault at arbitrarily one point within the transmission line system, alarms are notified to a monitoring apparatus from all of the devices which detected the stop of communication. Therefore, accordingly as an affect of the fault is spread in the communication line system, the number of alarms, which are notified to and arrived at the monitoring apparatus, increases.

It is necessary to consider the following states (1) and (2) for executing, by using such alarm, a fault diagnosis in the transmission line.

(1) There exist a time delay in alarm propagation and a time delay in alarm detection, and these are not constant. Then, an order of alarm, observed by the monitoring apparatus, is not constant.

(2) There are plural fault hypotheses, which cause the observed alarm. Therefore, it may be not possible to decide whether only one fault has occurred and spread over the communication line or plural faults were simultaneously occurred.

In a prior art of fault diagnosis based on alarm of which observation order is not stable or constant, It is generally to collect a set of alarms within a time window after a fault occurred, and to decide the most probable fault hypothesis which explains the set of alarms within the time window.

However, the prior art is not able to select the most probable fault hypothesis when there is a loss in the observed data. Then, in the prior art, it is necessary to decide a priority between the hypotheses by a try and error manner.

SUMMARY OF THE INVENTION

An object of the present invention is to provide a method of fault diagnosis which can minimize the necessary time for observing alarms without a lack of precision.

Another object of the present invention is to provide a method of fault diagnosis which can estimate the most probable fault portion even if there is a loss in the observed alarm data.

For solving these objects and performing a fault diagnosis in the present invention, a fault hypothesis is expressed by a time-series model based on an alarm propagation model, and a problem for selecting the fault hypothesis is changed to a problem for judging a likelihood of the time-series model.

In a preferred embodiment, the present invention is directed to a method of fault diagnosis based on using, as an observed information, a model of alarm propagation comprising the steps of:

presuming a fault hypothesis as a time-series model prescribed by a parameter of time delay;

defining a likelihood of the fault hypothesis by a product of a probability density of an observation delay time about alarm which is observed at a fault occurrence;

deciding the most probable fault hypothesis by comparing likelihood between the observed alarm time-series and the fault hypotheses; and estimating a fault portion based on the decision.

In a further preferred embodiment, the present invention is directed to a method further comprising the steps of:

obtaining AIC (Akaike's Information-theoretic Criterion) of each fault hypothesis;

arranging the fault hypotheses in order of small AIC; and identifying, as the most probable fault hypothesis, the fault hypothesis whose AIC is the minimum.

In a still further preferred embodiment, the present invention is directed to a method further comprising the steps of:

constructing a fault tree of which node corresponds to each device and of which link corresponds to each connection between the devices;

defining a probability distribution and a probability density function of the observation delay time of alarm, by giving alarm detection delay to each node and giving alarm propagation delay to the link, respectively as alarm delay parameter associated with a route of the fault tree;

estimating, before alarm arrival, a likelihood of the fault hypothesis at a time t when alarm is observed, by the probability density function;

defining, after alarm arrival, as the likelihood of the fault hypothesis at the time t when alarm is observed, a value of the probability density function when alarm arrived; and defining the likelihood of each fault hypothesis by the product of the probability density function of the occurred alarm.

The objects of the present application will become more readily apparent from the detailed description given hereafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings which are given by way of illustration only and wherein.

DESCRIPTION OF THE PREFERRED EMBODIMENT

A preferred embodiment of the present invention will be explained.

First, an alarm propagation model is made by using a fault tree and its process will be explained.

A fault tree is a knowledge representation in which a node corresponds to a parameter indicating a state of a system, and a link having a direction represents a cause and effect between the nodes. Such fault tree is used for fault diagnosis of a chemical plant and its usefulness is recognised.

Therefore, in the present invention, a fault tree is constructed according to a relationship of connections between devices which construct a system to be monitored. Further, an alarm propagation model Is defined by associating time delay, until alarm observation, with the fault tree.

Figure 1:
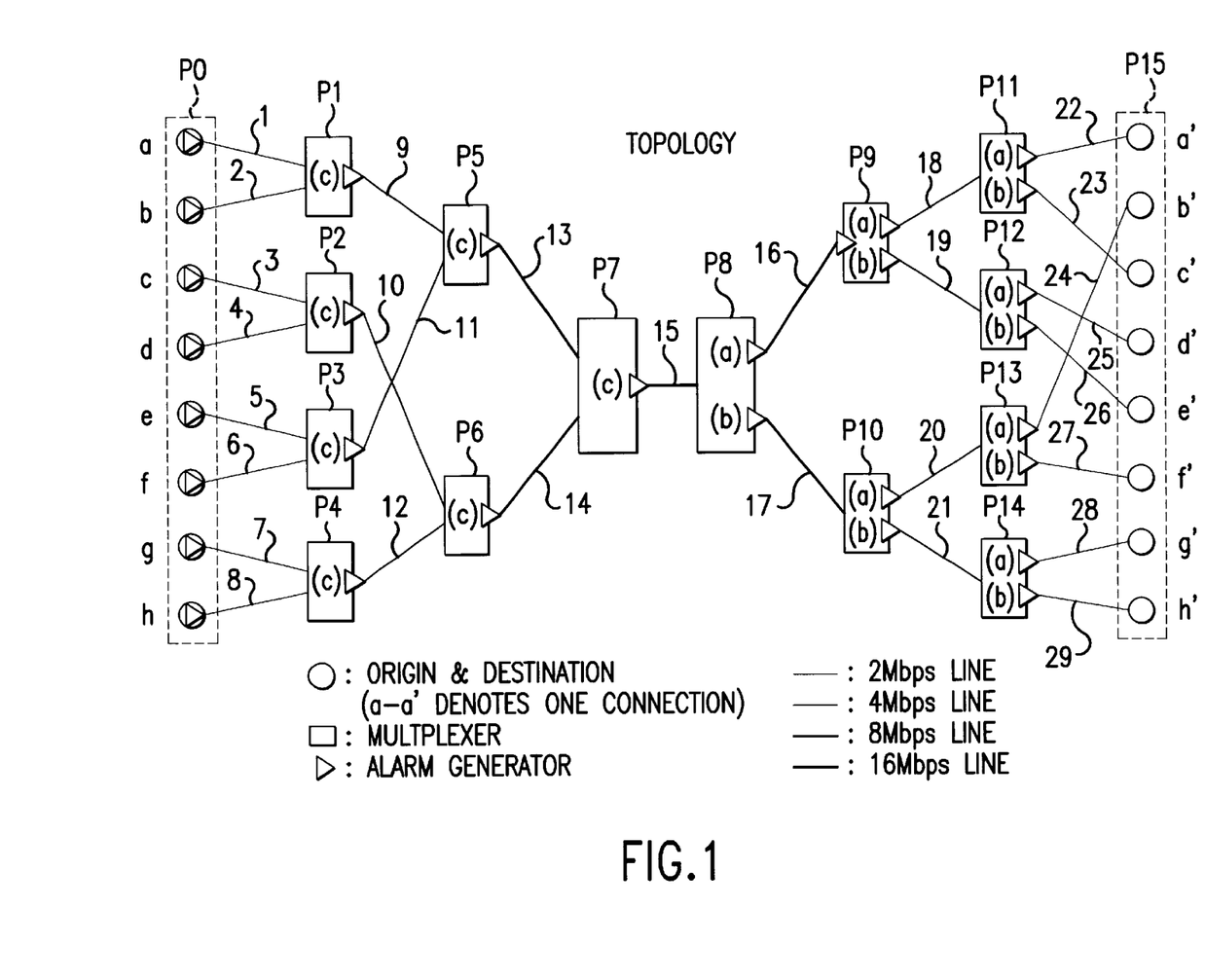
FIG. 1 shows a topology of a transmission line in the preferred embodiment of the present invention.

In this embodiment, a topology of a transmission line shown in FIG. 1, is assumed.

In FIG. 1, devices a, b, c, d, e, f, g and h exist in a transmitting side P0, and devices a', b', c', d', e', f', g' and h' exist in a receiving side P15. Between the devices in the side P0 and the devices in the side P15, the devices having same alphabetic character are connected each other as a–a', b–b', c–c', d–d', e–e', f–f', g–g' and h–h'. P1, P2, P3, P4, P5, P6 and P7 denote multiplex devices (multiplexers). De-multiplexers (de-multiplex devices) P8, P9, P10, P11, P12, P13 and P14 correspond to those multiplexers P1, P2, P3, P4, P5, P6 and P7 respectively.

Each device a, b, c, d, e, f, g, h in the transmitting side P0 has a unit for generating alarm Each of $0a, 0b, 0c, 0d, 0e, 0f, 0g$ and $0h$ denotes the alarm generating unit of each devices, corresponding to a, b, c, d, e, f, g and h respectively.

Further, each multiplexer has an alarm generating unit (c). Each of $1c, 2c, 3c, 3c, 4c, 5c, 6c$ and $7c$ denotes the alarm generating unit of each multiplexer, corresponding to P1, P2, P3, P4, P5, P6 and P7 respectively. Each de-multiplexer has an alarm generating unit (a) and an alarm generating unit (b). Each of $8a, 8b, 9a, 9b, 10a, 10b, 11a, 11b, 12a, 12b, 13a, 13b, 14a$ and $14b$ denotes the alarm generating unit of each de-multiplexer, corresponding to P8, P9, P10, P11, P12, P13 and P14, respectively.

The numerals 1 to 29 are used for identifying the links between the devices which includes the multiplexers and the de-multiplexers.

It is assumed that alarm is generated by the device in the downstream.

Further, as a delay from the an occurrence of fault to detection of alarm in each device (a, b, c, d, e, f, g, h, a', b', c', d', e', f', g', h' P1, P2, P3, P4, P5, P6, P7, P8, P9, P10, P11, P12, P13, P14) on the transmission line, a detection delay and a propagation delay are defined. Wherein, the detection delay is a time necessary from a detection of something wrong by the alarm generation unit to a recognition of the something wrong by the monitoring apparatus after an arrival of alarm The propagation delay is a time during which a fault in a device affects the adjacent device.

Figure 2:
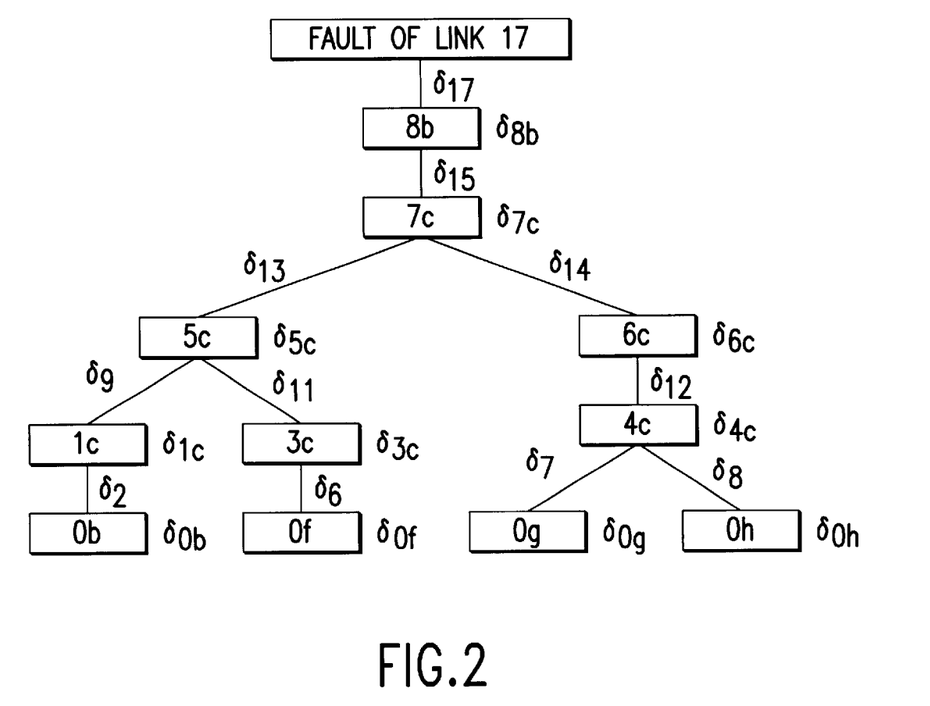
FIG. 2 shows a fault tree corresponding to fault of the link 17 only.

As shown in FIG. 2, a fault tree, describing an affection of a fault, is made by associating each alarm detection delay and each alarm propagation delay with the topology shown in FIG. 1. Namely, the alarm detection delay is associated with each node and the alarm propagation delay is associated with each link.

The fault tree shown in FIG. 2 corresponds to fault only in the link 17. In FIG. 2, among the alarm delay parameters, each of $\lambda 8b, \lambda 7c, \lambda 5c, \lambda 6c, \lambda 1c, \lambda 3a, \lambda 4c, \lambda 0b, \lambda 0f, \lambda 0g$ and $\lambda 0h$ denotes an alarm detection delay, and each of $\delta 17, \delta 15, \delta 14, \delta 13, \delta 11, \delta 9, \delta 8, \delta 7, \delta 6$ and $\delta 2$ denotes an alarm propagation delay.

Figure 3:
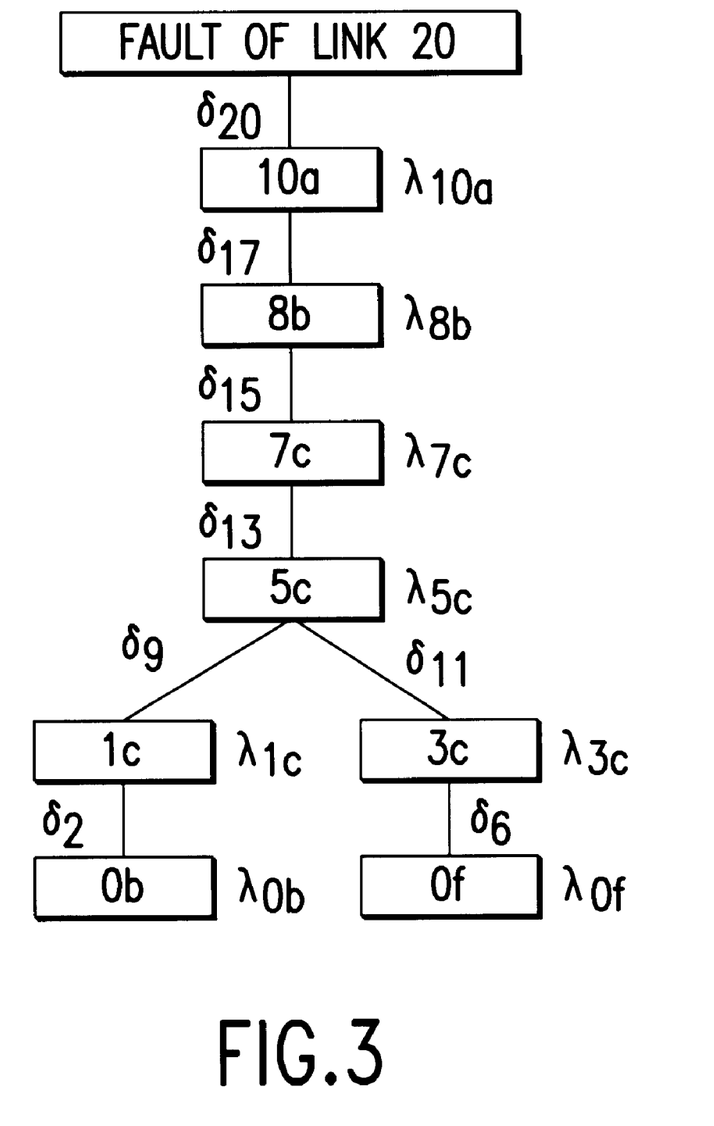
FIG. 3 shows a fault tree corresponding to fault of the link 20 only.
Figure 4:
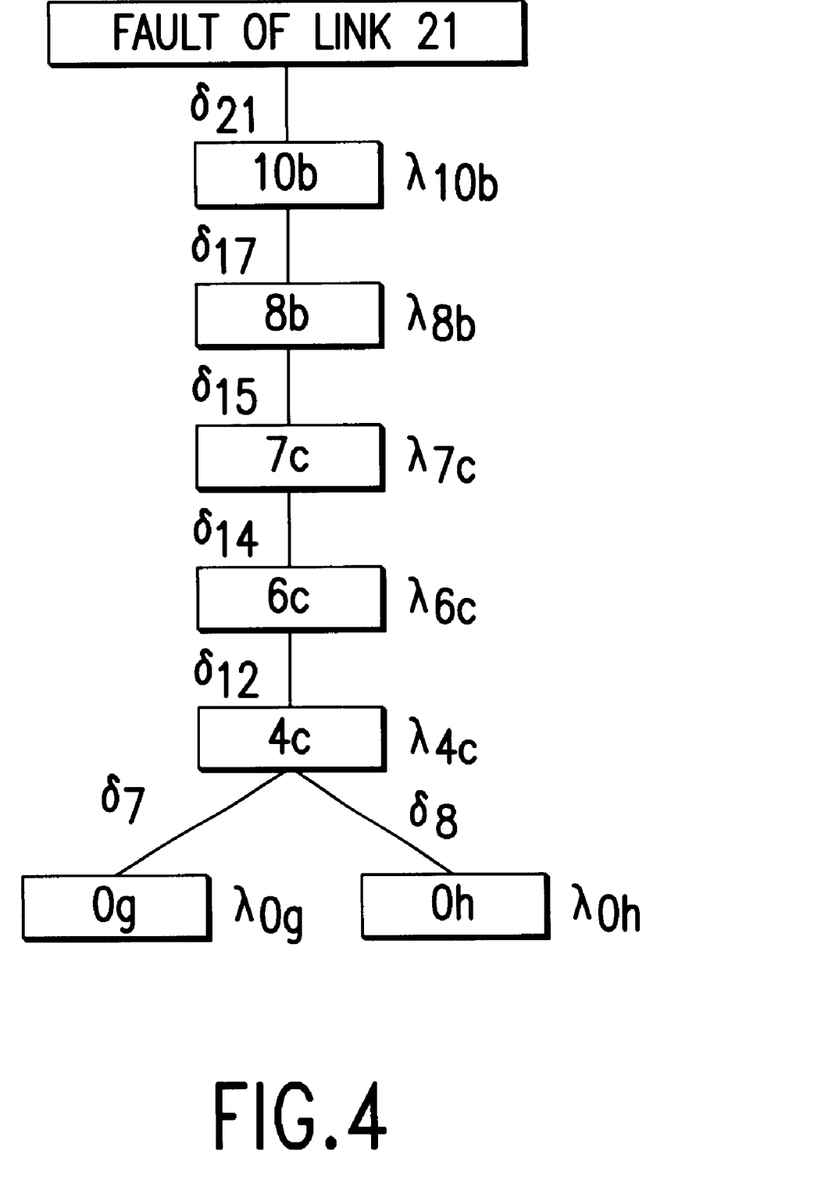
FIG. 4 shows a fault tree corresponding to fault of the link 21 only.
Figure 5:
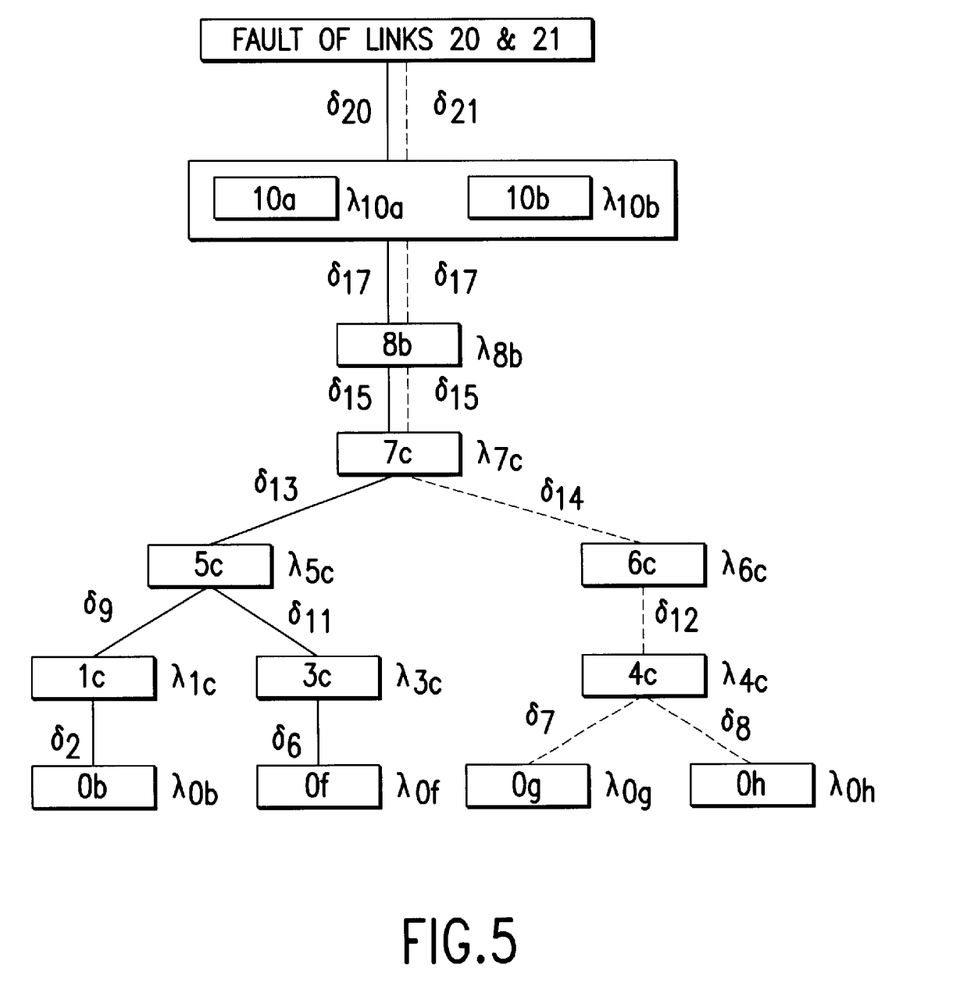
FIG. 5 shows a fault tree corresponding to simultaneous faults of the links 20 and 21.

In a same manner, FIG. 3 shows a'fault tree in case of considering fault of the link 20 only, FIG. 4 shows a fault tree in case of considering fault of the link 21 only, and FIG. 5 shows a fault tree considering simultaneous faults both of the links 20 and 21.

Next, regarding each fault tree, a probability distribution of alarm observation delay is decided. Its process will be explained. Wherein, symbols are defined as follows.
(1) Li: a fault hypothesis of the link i
(2) L: a set {Li} of fault hypotheses Li
(3) FTi: a fault tree being defined and accompanied with the fault hypothesis Li
(4) FT: a set {FTi} of the fault tree FTi
(5) ak: alarm notified from a node Nk
(6) A: a set of all alarms
(7) Ai: a set of alarms which can be observed under the fault hypothesis Li The relationship of the set Ai and the set A is indicated by the following equation 1.

$$Ai \subset A \qquad \text{[equation 1]}$$

The probability distribution of alarm observation delay, when a certain alarm ak is observed at a time t, is indicated by P{ak} (t|θik, t0). Wherein, the the alarm ak is raised by a fault which occurs in the link i at a time t0, and the relationship of the alarm ak and the set Ai is indicated by the following equation 2, and the symbol θik indicates a row or an arrangement or an alignment of the delay parameters accompanied with the route of the fault tree from the link i, where fault occurred, to a node Nj.

$$ak \in Ai \qquad \text{[equation 2]}$$

For example, in a case where fault occurred in the link 17, the probability distribution of the alarm observation delay is given by the following equations 3~7. In these equations 3~7, $\Delta i(t)$ denotes a distribution function of the alarm propagation delay $\delta i$, and $\Lambda i(t)$ denotes a distribution function of the alarm detection delay $\lambda i$, and a symbol ○ denotes a convolution.

$$P\{a8b\}(t|\delta 17, \lambda 8b, t0) = \Lambda 8b \circ \Delta 17(t) \qquad \text{[equation 3]}$$

$$P\{a7c\}(t|\delta 17, \delta 15, \lambda 7c, t0) = \Lambda 7c \circ \Delta 15 \circ \Delta 17(t) \qquad \text{[equation 4]}$$

$$P\{a6c\}(t|\delta 17, \delta 15, \delta 14, \lambda 6c, t0) = \Lambda 6c \circ \Delta 14 \circ \Delta 15 \circ \Delta 17(t) \qquad \text{[equation 5]}$$

$$P\{a4c\}(t|\delta 17, \delta 15, \delta 14, \delta 12, \lambda 4c, t0) = \Lambda 4c \circ \Delta 12 \circ \Delta 14 \circ \Delta 15 \circ \Delta 17(t) \qquad \text{[equation 6]}$$

$$P\{a0h\}(t|\delta 17, \delta 15, \delta 14, \delta 12, \delta 8, \lambda 0h, t0) = \Lambda 0h \circ \Delta 8 \circ \Delta 12 \circ \Delta 17(t) \qquad \text{[equation 7]}$$

Based on the alarm propagation model, an evaluation function is set as follows for estimating a fault portion.

A likelihood of the fault hypothesis Li is defined by the following equations 9 and 10, in a case where the equation 8 represents a alarm time sequence S at a time tk when the alarm ak is observed, and the probability density function, by which the alarm ak is observed at the time t under the fault hypothesis Li, is a function p{ak} (t|θi, t0). Further, a log-likelihood $LL(t|\theta i, t0)$ of the fault hypothesis Li is defined by the following equation 11, and the Akaike's Information-theoretic criterion $AIC(t|\theta i, t0)$ is defined, as an evaluation function for comparing the fault hypothesis model, by the following equation 12.

$$S = \{<ak, xk> | ak \in A, 1 < k < N, t0 < xk, x(k-1) \leq xk\} \quad \text{[equation 8]}$$

$$h\{ak\}(t|\theta i, t0) \equiv p\{ak\}(t|\theta i, t0) \quad \text{wherein, } t0 < t < xk \quad \text{[equation 9]}$$

$$p\{ak\} xk | \theta i, t0) \quad \text{wherein, } xk \leq t$$

$$h(t | \theta i, t0) \equiv \prod_{ak \in Ai} h\{ak\}(t | \theta i, t0) \quad \text{[equation 10]}$$

$$LL(t|\theta i, t0) = \log h(t|\theta i, t0) \quad \text{[equation 11]}$$

$AIC(t|\theta i, t0) = -2 \times LL(t|\theta i, t0) + 2 \times |\theta i|$, wherein $|\theta i|$ is a number of delay parameters $\theta i$. [equation 12]

It is necessary to estimate the time t0 when fault occurred, because the evaluation function $AIC(t|\theta i, t0)$ includes the time t0. For estimating, at the time t, the time $t0(t|\theta i)$ when fault occurred, the time $t0(t|\theta i)$ is calculated by the following equation 13 of the most probable estimation, wherein the observed alarm sequence S is given by $S = \{<ak, tk> | 0 < K < N\}$ and the row of the observation delay parameter is $\theta i$.

$$t0(t | \theta i) = \underset{t0}{\arg\max} LL(t | \theta i, t0) \quad \text{[equation 13]}$$

Next, a simultaneous fault hypothesis $L\{i+j\}$ is considered. The simultaneous fault hypothesis $L\{i+j\}$ is synthesized by the fault hypothesis Li and the fault hypothesis Lj.

A likelihood of the simultaneous fault hypothesis $L\{i+j\}$ is defined by the following equations 14 to 16, dependent on whether the alarm ak is included in the fault hypothesis Li or the fault hypothesis Lj or both of them.

If $ak \in Ai$ and $ak \in Aj$; [equation 14]

$$H\{ak\}(\theta\{i+j\}) = H\{ak\}(\theta i) + H\{ak\}(\theta j) - H\{ak\}(\theta i) H\{ak\}(\theta j)$$

then, $$h\{ak\}(\theta\{i+j\}) = h\{ak\}(\theta i) + h\{ak\}(\theta j) - (h\{ak\}(\theta i) H\{ak\}(\theta j) + H\{ak\}(\theta i) h\{ak\}(\theta j))$$

If $ak \in Ai$ and $ak \notin Aj$;

$$h\{ak\}(\theta\{i+j\}) = h\{ak\}(\theta i) \quad \text{[equation 15]}$$

If $ak \notin Ai$ and $ak \in Aj$;

$$h\{ak\}(\theta\{i+j\}) = h\{ak\}(\theta j) \quad \text{[equation 16]}$$

An evaluation function, which represents the likelihood of the each fault hypothesis when the alarm observation sequence is obtained, is required for estimating the fault hypothesis based on the alarm observation sequence. The evaluation function is required to satisfy such a property that an evaluation value becomes higher when the alarm observation delay is closer to an expectation value, and the evaluation value becomes lower when the alarm observation delay is more apart from the expectation value. The above-mentioned evaluation function $AIC(t|\theta i, t0)$ satisfies this requisite.

In considering that the fault hypothesis is a model which is prescribed by the set $\theta i$ of the delay parameters defined on each fault tree FTi, the most proper fault hypothesis to the observed alarm data is estimated as follows by using the evaluation function $AIC(t|\theta i, t0)$.

While a number of parameters which prescribe the time sequence model is the number $|\theta i|$ of the delay parameters, the number $|\theta i|$ depends on each fault hypothesis, then the number $|\theta i|$ is different from each other. However, it is possible to compare the models having different number of parameters, by using the AIC. Therefore, the most probable model $\theta^*$ can be obtained by the following equation 17.

$$\theta^* = \underset{\theta i}{\arg\min} AIC(\theta i) \quad \text{[equation 17]}$$

Figure 6:
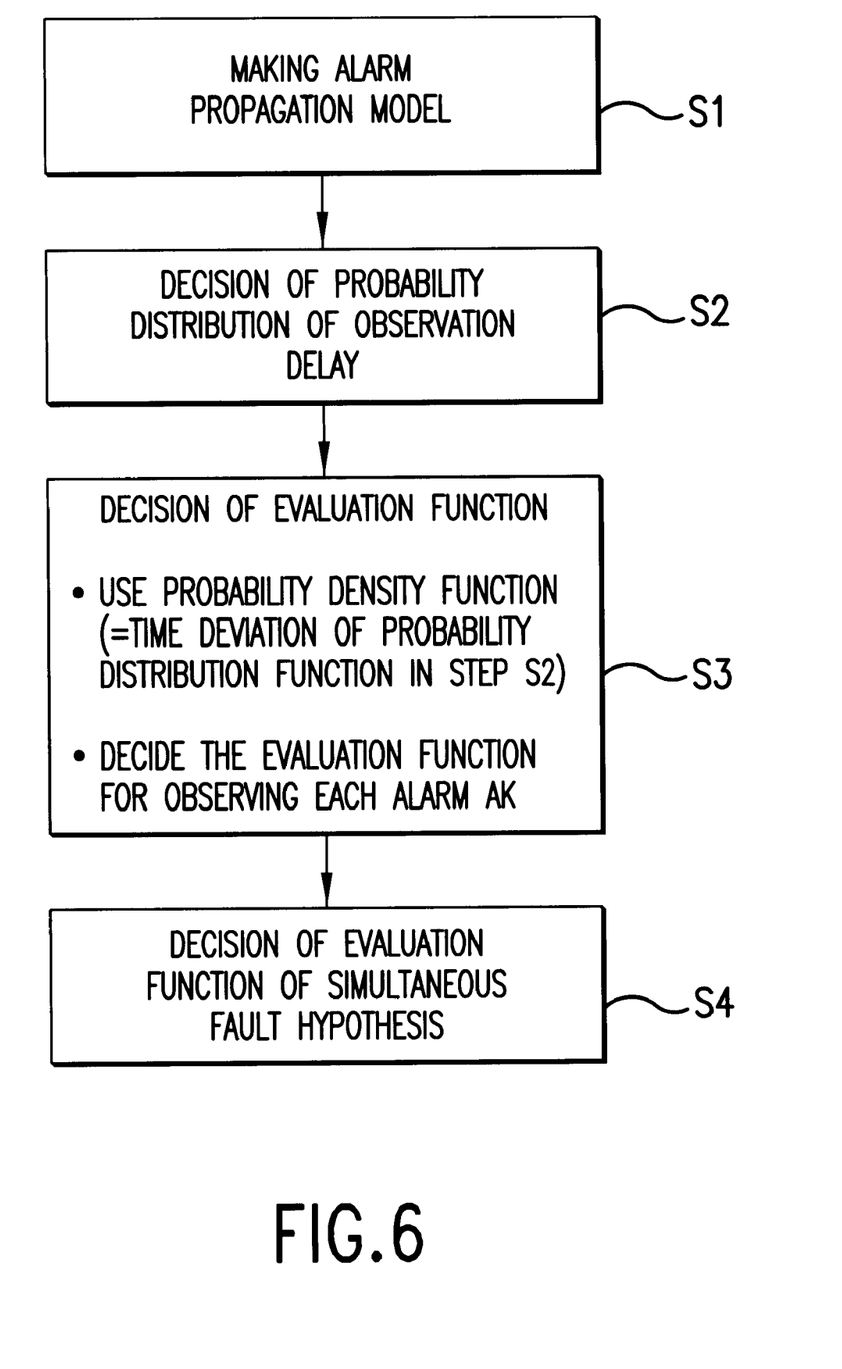
FIG. 6 shows a process for making an alarm propagation model and an evaluation,function.

FIG. 6 shows above-mentioned process from making alarm propagation model untill making the evaluation function.

Next, referring to follows ① to ④, an algorism for estimating the most probable fault hypothesis at the observation time will be explained, wherein the time sequence $S = \{<ak, tk> | 0 < k < N\}$ of the observed alarms is given as a list of alarms in order of the observation time.

Figure 7:
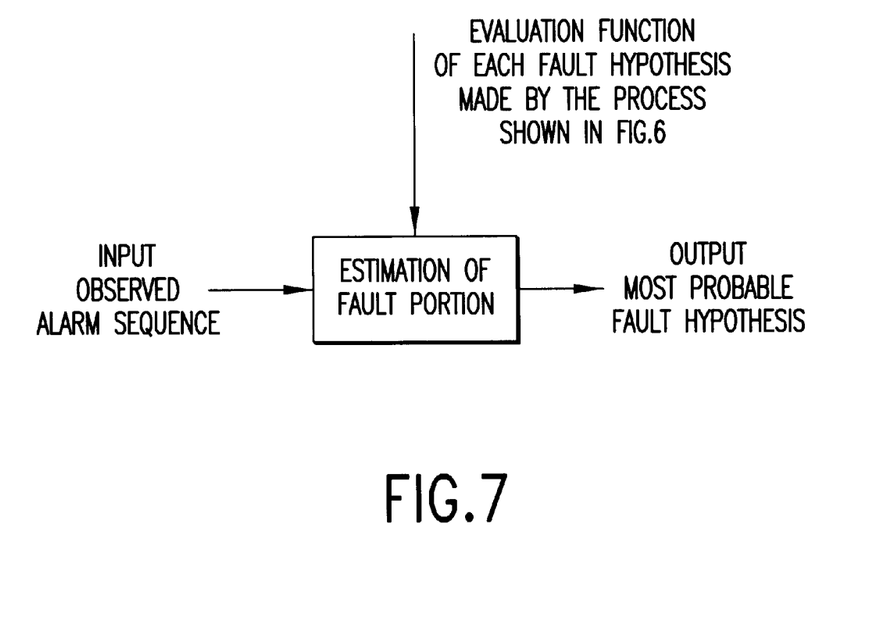
FIG. 7 shows an algorithm for estimating a fault portion based on an alarm propagation model.

In the algorism, as shown in FIG. 7, the time sequence $S = \{<ak, tk> | 0 < k < N\}$ of the observed alarms is input. Then, the most probable fault hypothesis is output by using the evaluation function made with the process shown in FIG. 6. Wherein, a symbol pop(S) represents an operation by which a first component of the time sequence S is picked out from the sequence S.

① Initial state
  (a) n:=0
  (b) t:=t1 (a time when the first alarm is observed)
  (c) a list of models to be possible:=a set of fault models based on a single device.
  (d) a list of models to be deleted:={ }

② $<ak, tk> := $pop(S)

③ while (n<Nmax) do {
  (a) n:=n+1;
  (b) t:=t+Δt;
  (c) if(t<tk) then {
    Fault occurrence time $t0(t|\theta i)$ is calculated by equation 13.
    $AIC(t|\theta i)$ is calculated about all $\theta i$ which are included within the list of models to be possible.
  } else {
    (1) [Deletion of the model from the list to be possible]
    About all $\theta i$ which are included within the list of models to be possible;
    if (ak is not included in Ai) then {
      (i) $\theta i$ is added to the list of the models to be deleted,
      (ii) $\theta i$ is deleted from the list of the models to be possible.
    }
    (2) [Addition to the model to the list to be possible] About all $\theta i$ which are included within the list of models to be possible, and all $\theta i$ which are included within the list of models to be deleted;
    {

(i) θi, of which ak is included in Ai, is selected, then θ{i+j} is added to the list of models to be possible. Further, fault occurrence time t0(t|θi) is calculated by equation 13.

(ii) AIC(t|θ{i+j} is calculated.}
}

(d) The list of models to be possible is aligned in order of small AIC.

(e) if (n=Nmax) then the list of models to be possible is output and the process is stopped.

(f) if (t≧tk) then <ak, tk>=pop(S)

④ The models are output in order of the list of models to be possible.

Figure 8:
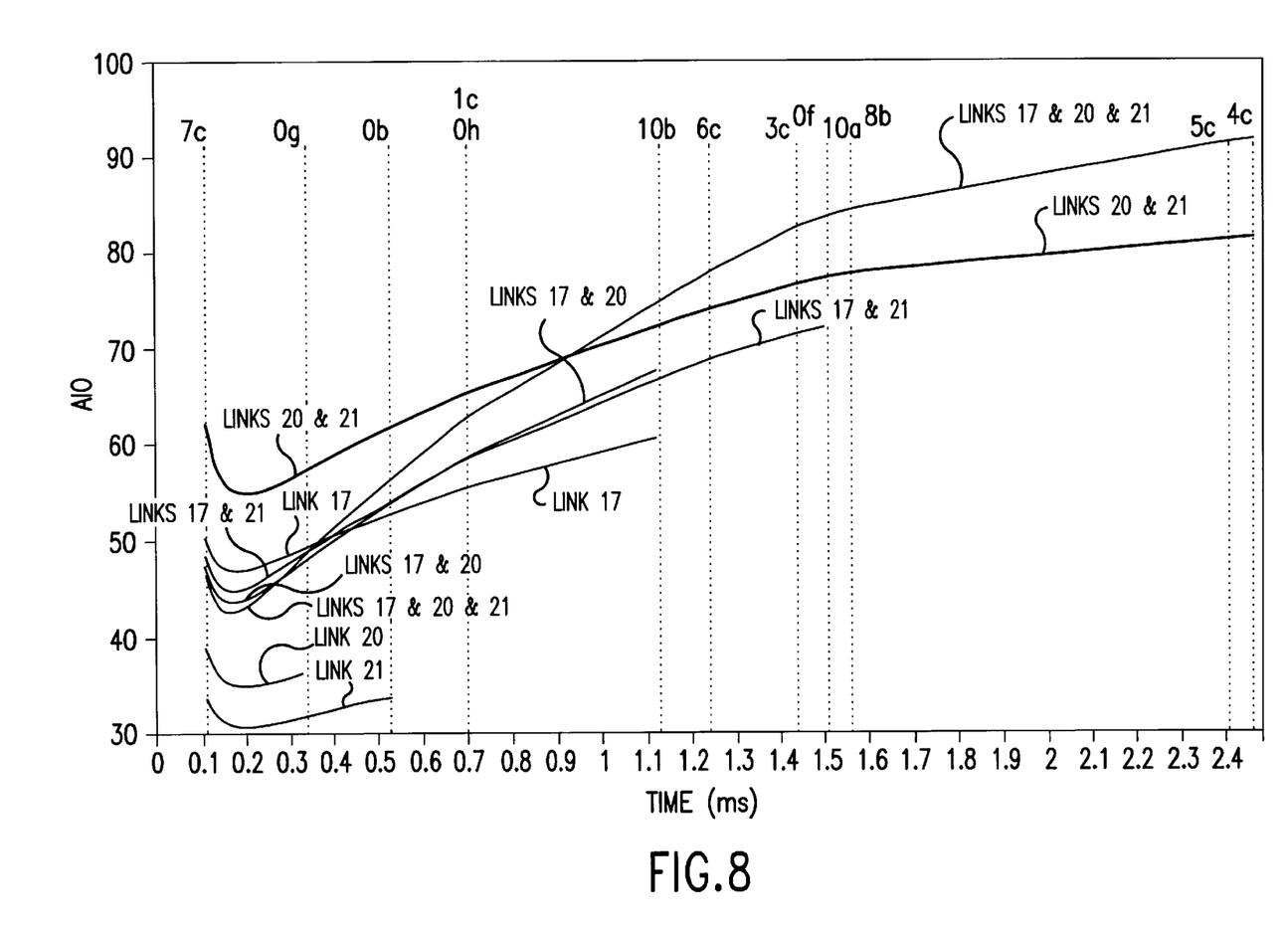
FIG. 8 shows changes in time of Akaike's Information-theoretic Criterion (AIC) of each fault hypothesis for an observed alarm sequence.

FIG. 8 shows changes in time of Akaike's Information-theoretic Criterion (AIC ) of many fault hypotheses, when fault of the link 20 and fault of the link 21 simultaneously occurred. For example, there are considered a fault hypothesis on single fault In the link 17, a no fault hypothesis on single fault in the link 20, a fault hypothesis on single fault in the link 21, and a fault hypothesis on simultaneously occurred faults in plural of the links 17, 20 and 21.

According to FIG. 8, since the fault hypothesis, which can not explain the observed alarm, is deleted in course of time from the list of models to be possible, for example, the fault hypothesis on the single fault in the link 20 is rejected when the alarm 0g is observed. As the fault hypothesis of which AIC is the minimum, the lower fault hypothesis in FIG. 8 is the more probable hypothesis.

While a method for estimating a fault portion of the transmission line in the above-mentioned embodiment, this invention can be applied to an estimation or correlation method of a fault portion In a case where plural alarms simultaneously occurs in an arbitrarily, and also can be applied to an estimation method of a fault portion in a network such as a management of a congestion information about a road.

There are following effects of the present invention, (1) It is possible for the present invention to align the results of diagnosis in order of the likelihood of the fault hypothesis, while It Is Impossible for a prior art to clarify the probability of diagnosis error when diagnosis is executed in a constant time window.

(2) It is possible for the present invention to easily select the proper fault hypothesis by defining the time sequence model as the fault hypothesis and selecting the time sequence model of the fault hypothesis which is nearest to the time sequence of the observed alarms, while it is necessary for a prior art to set a specific process and a complicated rule for diagnosis when a part of data was lost.

(3) It is possible for the present invention to select, based on AIC, a model of which likelihood is high and of which complexity is small when plural faults occur. On the other hand, in a prior art, a fault hypothesis, of which number of fault portions is small, is only selected when plural faults occur. Therefore, there is a problem that a simple model is selected in spite of high likelihood.

We claim:

1. A method of fault diagnosis based on using, as observed information, a model of alarm propagation comprising the steps of:

presuming a fault hypothesis as a time-series model prescribed by a parameter of time delay;

defining a likelihood of the fault hypothesis by a product of a probability density of an observation delay time about an alarm which is observed at a fault occurrence;

deciding the most probable fault hypothesis by comparing a likelihood between the observed alarm time-series and the fault hypotheses; and estimating a fault portion based on the decision.

2. The method claimed in claim 1 further comprising the steps of:

obtaining AIC (Akaike's Information-theoretic Criterion) of each fault hypothesis;

arranging the fault hypotheses in order of small AIC; and identifying, as the most probable fault hypothesis, the fault hypothesis whose AIC is the minimum.

3. The method claimed in claim 1 further comprising the steps of:

constructing a fault tree which node corresponds to each device and which link corresponds to each connection between the devices;

defining a probability distribution and a probability density function of the observation delay time of alarm, by giving alarm detection delay to each node and giving alarm propagation delay to the link, respectively as alarm delay parameter associated with a route of the fault tree;

estimating, before alarm arrival, a likelihood of the fault hypothesis at a time t when alarm is observed, by the probability density function; defining, after alarm arrival, as the likelihood of the fault hypothesis at the time t when alarm is observed, a value of the probability density function when alarm arrived; and defining the likelihood of each fault hypothesis by the product of the probability density function of the occurred alarm.

4. A method of fault diagnosis in a network, which has a plurality of nodes which define communication devices and a plurality of links which define lines between the nodes, based on using an alarm notified to a monitoring device from an alarm generating unit provided for each of the nodes, said method comprising steps of:

pre-determining, by each fault hypothesis, an alarm propagation model with an alarm detecting delay and an alarm propagation delay according to a topology of the network;

wherein said alarm detection delay being a random variable of probability density function of a required time to send an alarm notification from each of the alarm generating units to the monitoring device and said alarm propagation delay being a random variable of probability density function of a required time for a fault to propagate from one of the nodes to another of the nodes along the link;

obtaining a likelihood of each fault hypothesis by convoluting said alarm detection delay and said alarm propagation delay at a certain fault occurrence;

obtaining Akaike's Information-theoretic Criterion of each obtained likelihood;

arranging the fault hypotheses in order of small Akaike's Information-theoretic Criterion;

identifying, as the most probable fault hypothesis, the fault hypothesis whose Akaike's Information-theoretic Criterion is the minimum; and estimating a fault portion in the network based on said identification.

* * * * *